(12) United States Patent
Fiske

(10) Patent No.: US 7,249,116 B2
(45) Date of Patent: Jul. 24, 2007

(54) MACHINE LEARNING

(75) Inventor: Michael Stephen Fiske, San Francisco, CA (US)

(73) Assignee: Fiske Software, LLC, San Francisco, CA (US)

( * ) Notice: Subject to any disclaimer, the term of this patent is extended or adjusted under 35 U.S.C. 154(b) by 418 days.

(21) Appl. No.: 10/409,431

(22) Filed: Apr. 6, 2003

(65) Prior Publication Data
US 2003/0236761 A1 Dec. 25, 2003

Related U.S. Application Data

(60) Provisional application No. 60/370,136, filed on Apr. 8, 2002.

(51) Int. Cl.
G06F 17/00 (2006.01)
G06N 5/02 (2006.01)

(52) U.S. Cl. ............... 706/46; 706/12; 706/45

(58) Field of Classification Search ......... 706/46, 706/12, 45
See application file for complete search history.

(56) References Cited

U.S. PATENT DOCUMENTS

| | | | |
|---|---|---|---|
| 4,697,242 A | 9/1987 | Holland et al. | |
| 4,881,178 A | 11/1989 | Holland et al. | |
| 5,212,821 A | 5/1993 | Gorin et al. | |
| 5,343,554 A * | 8/1994 | Koza et al. | 706/13 |
| 5,390,282 A | 2/1995 | Koza et al. | |
| 5,400,436 A | 3/1995 | Nara et al. | |
| 5,479,570 A * | 12/1995 | Imagawa et al. | 706/20 |
| 5,504,884 A | 4/1996 | Kyuma et al. | |
| 5,526,281 A | 6/1996 | Chapman et al. | |
| 5,555,317 A | 9/1996 | Anderson | |
| 5,577,167 A | 11/1996 | Brown | |
| 5,675,710 A | 10/1997 | Lewis | |
| 5,742,738 A | 4/1998 | Koza et al. | |
| 5,818,963 A | 10/1998 | Murdock et al. | |
| 5,819,247 A | 10/1998 | Freund et al. | |
| 5,848,403 A * | 12/1998 | Gabriner et al. | 706/13 |
| 5,930,780 A * | 7/1999 | Hughes et al. | 706/13 |
| 5,940,825 A * | 8/1999 | Castelli et al. | 707/6 |
| 5,946,673 A | 8/1999 | Francone et al. | |
| 5,946,674 A | 8/1999 | Nordin et al. | |
| 5,946,675 A | 8/1999 | Sutton | |
| 6,067,539 A | 5/2000 | Cohen | |
| 6,081,766 A | 6/2000 | Chapman et al. | |
| 6,098,059 A | 8/2000 | Nordin et al. | |
| 6,128,607 A | 10/2000 | Nordin et al. | |
| 6,260,031 B1 * | 7/2001 | Schaffer et al. | 706/13 |
| 6,275,611 B1 | 8/2001 | Parthasarathy | |
| 6,286,000 B1 | 9/2001 | Apte et al. | |
| 6,289,353 B1 | 9/2001 | Hazlehurst et al. | |
| 6,341,372 B1 * | 1/2002 | Datig | 717/136 |
| 6,418,434 B1 | 7/2002 | Johnson et al. | |
| 6,424,980 B1 | 7/2002 | Iizuka et al. | |
| 6,424,997 B1 | 7/2002 | Buskirk, Jr. et al. | |
| 6,493,686 B1 * | 12/2002 | Francone et al. | 706/12 |
| 6,502,081 B1 | 12/2002 | Wiltshire, Jr. et al. | |
| 6,513,025 B1 | 1/2003 | Rosen | |
| 6,523,016 B1 | 2/2003 | Michalski | |
| 6,529,887 B1 | 3/2003 | Doya et al. | |
| 6,532,305 B1 | 3/2003 | Hammen | |
| 6,651,049 B1 * | 11/2003 | Agrawal et al. | 707/2 |
| 6,751,621 B1 * | 6/2004 | Calistri-Yeh et al. | 707/100 |
| 6,810,118 B1 * | 10/2004 | Martin | 379/221.08 |
| 6,868,525 B1 * | 3/2005 | Szabo | 715/738 |
| 6,928,368 B1 * | 8/2005 | Bulla et al. | 702/19 |
| 6,950,696 B2 * | 9/2005 | Bjorling et al. | 600/515 |

* cited by examiner

Primary Examiner—Joseph P Hirl
(74) Attorney, Agent, or Firm—David Lewis

(57) ABSTRACT

This invention relates to the machine recognition and learning of predetermined categories and more generally, to the representation of patterns, information and knowledge in computational applications. A method of learning categories is an important component of advanced software technology. This invention has applications in the following areas: bioinformatics, document classification, document similarity, financial data mining, goal-based planners, handwriting and character recognition, information retrieval, natural language processing, natural language understanding, pattern recognition, search engines, strategy based domains such as business, military and games, and vision recognition.

92 Claims, 2 Drawing Sheets

Unbounded Crossover

Before Crossover

Bit Sequence A

Bit Sequence B

After Crossover

Bit Sequence A

Bit Sequence B

MACHINE LEARNING

CROSS-REFERENCE TO RELATED APPLICATION

This application claims the benefit of Provisional Patent Application Ser. No. 60/370,136 filed 2002, Apr. 8.

I. FEDERALLY SPONSORED RESEARCH

Not Applicable.

II. COMPUTER PROGRAM

Attached with this patent application is a CD-ROM. There is JAVA source code stored on the enclosed CD-ROM in the directory Krugfat. The JAVA source code shows a sample implementation of Krugfat.

III. BACKGROUND—FIELD OF INVENTION

Many researchers have attempted to develop flexible knowledge representation and machine learning methodologies to solve problems in the field of machine intelligence (AI), and explain theories of the mind in cognitive psychology. The machine learning methodology presented here is a subset of a theory and methodology developed to overcome many of the knowledge representation and machine learning difficulties encountered over the past 50 years.

In particular, this invention relates to the machine recognition and learning of predetermined categories. A method of learning categories is an important component of advanced software technology, cognitive psychology, and philosophy, [WITTGENSTEIN].

IV. ADVANTAGES OF INVENTION OVER PRIOR ART

1.) A substantial part of the uniqueness and novelty of KRUGFAT is that its machine learning system exploits the advantages of bottom-up components and top-down components, while avoiding their respective disadvantages. As many researchers in the field of AI and cognitive science have recognized over the last 20 to 30 years, certain types of cognitive tasks are better performed by bottom-up machine learning and knowledge representation methodologies, and others are better performed by top-down methods, [MINSKY].

A typical bottom-up learning algorithm and representation is a feedforward neural network using a back propagation training algorithm. [HERTZ, KROGH, PALMER] Other types of cognitive tasks are better performed by strictly top-down methodologies as IBM's Deep Blue software program that plays chess [DEEP BLUE], and Hammond's CHEF program which creates new cooking recipes by adapting old recipes, [RIESEBECK, SCHANK].

a.) An advance of KRUGFAT is that typical bottom-up methodologies, do not store any prototypical examples, or do not construct an adaptable template that represents a prototypical combination of the examples. KRUGFAT enables the synthesis of prototypical examples. The utilization of prototypical examples greatly increases machine learning accuracy and speed.

b.) An improvement of KRUGFAT is over top-down methodologies. A weakness of strictly top-down methodologies is that the building blocks or knowledge representation of that particular domain—in CHEF it would be all the primitives about FOOD, COOKING, and RECIPES—are fixed and pre-defined by the software developer (a human being). This makes the knowledge representation of the software brittle. As a consequence, the program has no basis for dealing with a new example that is applied to different circumstances, [FEYNMAN]. On the other hand, KRUGFAT builds its templates and template maps so that it robustly handles new examples.

c.) KRUGFAT has flexibility in creating many applications of machine learning and knowledge representation across many different applications: bioinformatics, document classification, document similarity, financial data mining, goal-based planners, handwriting and character recognition, information retrieval, natural language processing and response, natural language understanding, pattern recognition, search engines, strategy based domains such as business, military and games, and vision recognition. However, the previous list does riot cover all possible applications of KRUGFAT.

2.) A substantial improvement of the learning process in KRUGFAT over alternative training methods is that it does not get stuck in local minima, [FISKE1]. The learning phase of KRUGFAT avoids local minima problems because it does not use a locally "greedy" optimization algorithm such as gradient descent, [HERTZ, KROGH, PALMER]. Many bottom-up systems suffer from the local minima problem. Because of the local minima problem, often times it can takes weeks or months to satisfactorily train a program implementing a practical application. In some cases, gradient descent may NEVER train satisfactorily in a practical amount of time.

3.) The KRUGFAT learning phase is much faster than previous methods. For example, to construct all the templates necessary to distinguish between any two handwritten letters takes about 30 minutes on a Pentium III, 900 Mhz laptop. Typical neural network training times for handwriting recognition often take a few days or more than a week, depending on the computing resources used during the training.

4.) The KRUGFAT recognition phase is much faster than previous methods. It exploits the "exponential principle" to increase its speed. As an example of this speed, consider a program that recognizes Chinese characters. According to a web source, 171,882,493 Chinese characters appeared on Usenet newsgroups from 1993-1994, [CHINESE CHARACTERS]. Some estimates state that there are 180 million distinct categories of Chinese characters. If the software constructs a set of templates that on average eliminate ⅓ of the remaining Chinese character categories, then this means that one trial of the recognition phase on average uses only 46 randomly chosen templates to reduce 180 million potential Chinese categories down to a single character. (46 templates is computed by finding the smallest exponent n satisfying the inequality $(180,000,000)*(\frac{2}{3})^n < 2$.)

V. DETAILED DESCRIPTION OF THE INVENTION

Figure 1:
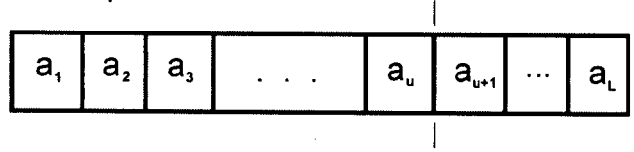
FIG. 1 shows a diagram of a representation of an example of an Unbounded Crossover.
Figure 1:
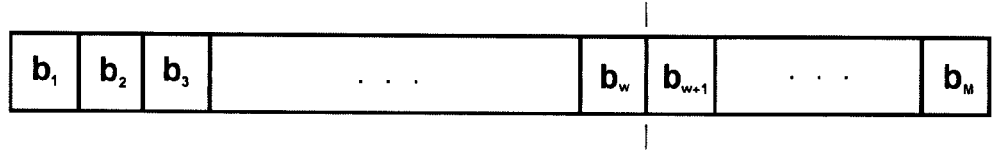
Figure 1:
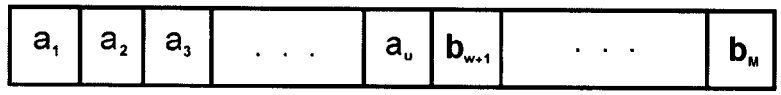
Figure 1:
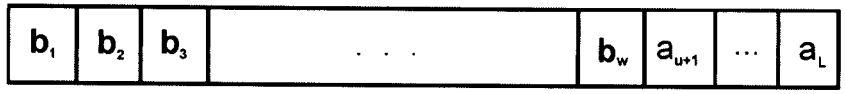
Figure 2:
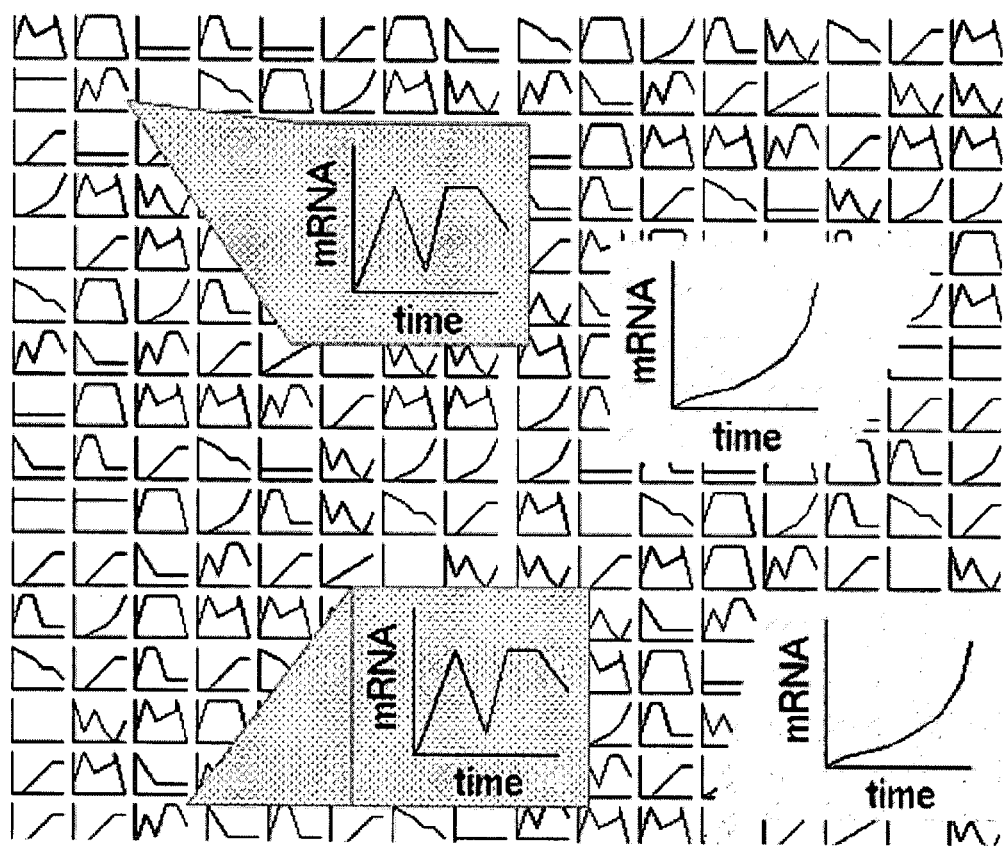
FIG. 2 shows an array of plots in which each plot represents a gene expression.

Section A explains the vocabulary and concepts necessary to KRUGFAT's present the recognition phase and learning phase in sections B and C. Section D discusses Unbounded Building Block Evolution, which can be used to enhance the learning phase. Section E applies KRUGFAT to handwriting recognition. Section F applies KRUGFAT to document classification and information retrieval. Section G applies KRUGFAT to gene expression. Section H explains template maps of templates.

A. Vocabulary and Definitions

The first element of KRUGFAT is a space C, called a category space. Often a space is a mathematical set, but it could have more structure than a set. For this reason, the word 'space' is used instead of 'set'. For a well-written introduction to set theory, the first twenty pages of [HALMOS] is excellent.

If the category space is about concepts that are living creatures, then typical members of C are the categories: "dog", "cat", "animal", "mammal", "tiger", "lizard", "starfish", "tree", "birch tree", "cherry tree", "barley". A different type of a category space is the letters of our alphabet: {a, b, c, d, e, f, g, h, i, j, k, l, m, n, o, p, q, r, s, t, u, v, w, x, y, z}. Another more abstract type of category space could be the functional purpose of genes. One category is any gene that influences eye color; another category is any gene that codes for enzymes used in the liver; another category is any gene that codes for membrane proteins used in neurons; and there are thousands more functional categories that genes code for. In short, the structure of the category space depends upon what set of possibilities that you want the software to retrieve, recognize, categorize or classify.

Another important concept is the possibility space E. The possibility space is the set of every possible example that anyone could ever conceive of. If you were to write a software program that recognizes handwritten letters for the English language, then the possibility space would include every handwritten 'a' ever written and any 'a' that could be written in the future; and every handwritten 'b' ever written and any 'b' that could be written in the future; . . . ; and every handwritten 'z' ever written and any 'z' that could be written in the future.

There are also a set of learning examples: $\{e_1, e_2, \ldots e_m\}$ which is a subset of the possibility space E. The learning examples are the particular list of examples used to train the software program. There is a God function, also called the God map, $G:E \to P(C)$ where $P(C)$ is the power set of C. (Recall that the power set is the set of all subsets. If the set is S={"dog", "cat"}, then the power set of S, P(S)={, {"dog"}, {"cat"}, {"dog", "cat"}}.

What this means is that each example e in E is classified as lying in 0, 1 or many categories. It is called a God map because God knows exactly what categories any example from the possibility space is in, but software programs and human beings sometimes do not know. An illustration of this is the example e="Morris the Cat" lies in the categories "cat", "animal", "mammal". In other words, G(e)={"cat", "animal", "mammal"}. The purpose of the machine learning methodology is to construct a function $g:E \to P(C)$ so that g(e)=G(e) for every example e in the possibility space E. Obviously, G is the ideal or perfect function that a person or computer program wishes to learn: this is why G is called the God map.

The next important concept is that of a template. A template is anything that can be used to distinguish between two different categories of patterns, information or knowledge. For example, if the two different categories are the letters 'a' and 'l', then "the shape has a loop in it" is a template because it distinguishes 'a' from 'l'.

The expression $\{T_1, T_2, \ldots, T_n\}$ denotes a collection of templates, called the template set. Associated to each template, there can be a corresponding template value function $T_i: E \to V$, where V is a template value space. There are no restrictions made on the structure of V. V may be equal to a subset of the real line, a subset of the integers, a discrete set, a manifold, or even a function space.

The symbol P(V) denotes the power set of V. Each template $T_i$ can have a corresponding prototype function $T_i: C \to P(V)$. This prototype function is constructed during the learning phase. If c is a category in C, $T_i(c)$ equals the set of prototypical template values that one expects for all examples e that lie in category c. Intuitively, the prototype function is a measure of the template's generalization properties.

For each (template, category) pair $(T_i, c)$, there is a matching function $M_{(T_i, c)}$, which tells us if the template value is similar enough to its set of prototypical values. Thus, $M_{(T_i, c)}: V \to S$, where S is the similarity space.

An example of a specific matching function is described here. In this particular example, choose V={0, 1}. Further, choose the similarity space S equal to {0, 1}. Consider a template value $v_1$. If $v_1$ is similar to its prototypical set $T_i(c)$, then $M_{(T_i, c)}(v_1)=1$. If $v_1$ is not similar enough to its prototypical set $T_i(c)$, then $M_{(T_i, c)}(v_1)=0$.

Assume there are two categories $\{c_1, c_2\}$ and two templates $\{T_1, T_2\}$. Assume the prototypical functions for $T_1$ and $T_2$ are defined as: $T_1(c_1)=\{1\}$ and $T_1(c_2)=\{0, 1\}$. $T_2(c_1)=\{0, 1\}$ and $T_2(c_2)=\{0\}$.

Then there are 4 distinct matching functions: $M_{(T_1, c_1)}$, $M_{(T_2, c_1)}$, $M_{(T_1, c_2)}$, $M_{(T_2, c_2)}$.

The functions are defined as follows:

1.) $M_{(T_1, c_1)}(0)=0$ AND $M_{(T_1, c_1)}(1)=1$
2.) $M_{(T_2, c_1)}(0)=1$ AND $M_{(T_2, c_1)}(1)=1$
3.) $M_{(T_1, c_2)}(0)=1$ AND $M_{(T_1, c_2)}(1)=1$
4.) $M_{(T_2, c_2)}(0)=1$ AND $M_{(T_2, c_2)}(1)=0$

The previous matching function is defined in a simple way to make the concept easier to understand. The similarity space S is the range of the matching function, and is sometimes equal to the unit interval [0, 1], to a subset of $\mathbb{R}^n$, a discrete set, or even a function space.

Each template $T_i$ also has a corresponding probability $p_i$ of being chosen in the recognition phase. Let m be the number of trials, and $\rho$ be the number of templates randomly chosen in each trial. $\theta$ is the acceptable category threshold, and is represented by a real number between 0 and 1.

For each category c in C, there is a corresponding category score $s_c$. The score $s_c$ measures to what extent the program believes the example—it is trying to recognize—is in category c. Now that the fundamental concepts are defined, two primary processes of the machine learning system are explained: RECOGNITION and LEARNING.

B. Recognition

The expression $e_{cat}$ denotes an example from the possibility space that the software is supposed to classify, categorize, or recognize. Below is an implementation of the recognition phase.

Allocate memory and read learned templates from long-term memory

Initialize every category score $s_c$ to zero.

---

OUTER LOOP: m trials.
{
    Initialize set S equal to C.

-continued

```
INNER LOOP: Choose ρ templates randomly.
{
    Choose template, T_k, with probability distribution p_i.
    For each category c in S
    {
        IF M_(T_k,c) (T_k(e_cat) ) equals zero
        THEN remove category c from S.
        (set S = S - {c})
    }
}
For each category c remaining in S
{ Increment the category score s_c. }
}
```

Initialize A to the empty set.

For each category c in C, IF $(s_c/m) > \theta$, THEN add category c to A.

The answer is A. The example $e_{cat}$ is in the categories that are in A.

Comments on Recognition:

1.) If for some reason only the best category is returned as an answer, rather than multiple categories, then do this by replacing the step:

For each category c in C, IF $(s_c/m) > \theta$, THEN add category c to A.

Instead, search for the maximum category score if there are a finite number of categories. The answer is a single category that has a maximum category score. If there are an infinite number of categories in C, then take the supremum over all $s_c$ and use a category space that is complete assuring that the category corresponding to the supremum lies in C.

2.) If the template space V and the similarity space S have more structure, then the step:

IF $M_{(T_k,c)}(T_k(e_{cat}))$ equals zero is replaced by the more general step:

IF $T_k(e_{cat})$ is NOT close to its prototypical value set $T_k(c)$.

C. Learning

The initial part of the learning phase involves the construction of the templates from simple building blocks, using the examples and the categories to guide the construction. One method is for a person, user-created, to construct the templates based oil his or her expertise on the application. Another method is to use evolution implemented in hardware and/or software; described in section D, Unbounded Building Block Evolution, applied to template design, can build template value functions $T_a: E \rightarrow V$ from a collection of building block functions $\{f_1, f_2, f_3, \ldots, f_r\}$.

The remaining parts of the learning phase primarily involve constructing the matching functions $M_{(T_i,c)}$, constructing the prototype functions $T_i: C \rightarrow V$, setting the threshold $\theta$, and computing the probabilities $p_i$.

With this in mind, start with a collection of learning examples along with the categories that each example lies in. The type of template values—the members of V—boolean, real, or functions enable many different methods for constructing the prototype functions, and matching functions. For clarity, template values used below are boolean, but in the more general case the template values can be real numbers, points on a manifold, or even functions.

As stated above, assume that $V=\{0, 1\}$, where 0 represents false and 1 represents true. In this case, each matching function M is easily determined: $M_{(T_i,c)}(v)=1$ if v lies in the prototypical set $T_i(c)$; and $M_{(T_i,c)}(v)=0$ if v does NOT lie in the prototypical set $T_i(c)$.

In the case where V is a continuum, for example, V can be the interval [0, 1], the circle $S^1$, or any other manifold, or any measurable space. Because there are an infinite number of spaces that V can represent, there are many ways of constructing the matching functions $M_{(T_i,c)}$.

With the previous in mind, below is an implementation of the learning phase—in particular, the construction of the prototype functions.

Allocate memory for the templates and read the templates from long-term memory, into the template set, $\{T_1, T_2, \ldots, T_n\}$. The templates read from long-term memory were user-created, created by Unbounded Building Block Evolution, or an alternative method.

```
OUTER LOOP: Iterate thru each template T_k
{
    Initialize S = T_k(c_1).
    Initialize A = S.
    INNER LOOP: Iterate thin each category c_i
    {
        Let E_(c_i) = the set of learning examples lying in category c_i.
        Construct the prototype function T_k as follows: Set T_k(c_i)
        EQUAL to the union of all template values v satisfying
        v = T_k(e) for some example e lying in E_(c_i).
        Set A equal to A ∪ T_k(c_i).
    }
    If A EQUALS S remove template T_k from the template set.
}
```

Store templates, remaining in the template set, in long-term memory.

Comments on Learning:

1.) The learning assumes that there are a finite number of categories, q.

2.) Setting the category threshold $\theta$ is best determined empirically. In the information retrieval application a threshold in the range of 0.5 to 0.7 yields the highest accuracy. In the handwriting recognition application a threshold range of 0.7 to 0.9 is the most accurate.

3.) For a fixed template, $T_k$, there has to be at least one pair of categories $(c_i, c_j)$ such that $T_k(c_i) \neq T_k(c_j)$. Otherwise, template $T_k$ can not separate any categories and thus, the program should remove template $T_k$.

4.) In tests, an average accuracy of greater than 85% and average recognition speed of one second was obtained, using a uniform probability distribution, $p_i = p_j$ for all i, j. However, some difficult categorization areas can benefit from a non-uniform probability distribution. In particular, we know that in some cases templates that do a better job of separating categories should have a higher probability of being chosen. For example, in Bioinformatics applications, one can construct a non-uniform probability distribution to create a voting procedure. In all applications tested, the results are at least 77% better when the behavior of the templates is, dependent on the categories remaining in the recognition phase.

D. Unbounded Building Block Evolution

This section presents a unique evolution called Unbounded Building Block Evolution, UBBE. UBBE can be used on its own for applications outside of KRUGFAT or used in the learning phase described in section C.

The first implementation of UBBE described here designs the template value functions $T_a: E \rightarrow V$, using the categories, examples and the building block functions. However, UBBE is flexible and general enough to build other elements besides templates from a collection of simple building blocks. The more general method of UBBE is explained toward the end of this section.

The use of an evolutionary process was first introduced by [BLEDSOE], [BOX], [BREMERMANN] and [FRIED- MAN] and further developed by [HOLLAND_1] and [HOLLAND_2]. At end of this section, the advantages of UBBE over prior art are discussed.

UBBE draws from a collection of building blocks and composes them together to build a useful element. In many cases, the building blocks are a collection of functions $f_\lambda: X \to X$, where $\lambda \in \Lambda$, X is a set and $\Lambda$ is an index set. In some cases, X is the set of real numbers, but it also may be a discrete set or a set with a different structure than a set of numbers. In handwriting recognition, covered in section E, the binary functions addition, subtraction, multiplication, and division comprise the building blocks. Further, in handwriting recognition X is the rational numbers. The index set, $\Lambda = \{1, 2, 3, 4\}$, has four elements. In other words, there are four building blocks: $f_1 = +$, $f_2 = -$, $f_3 = *$, and $f_4 = /$. In some cases, the index set may be infinite. For example, the functions $f_\lambda: \mathbb{R} \to \mathbb{R}$, such that $f(x) = x + \lambda$ is an infinite number of building blocks because $\lambda$ can take on an infinite number of values.

Before UBBE applied to template design is explained, the method of using bit-sequences to encode functions composed from building block functions will be discussed. A bit-sequence is a sequence of ones and zeroes, $[b_1, b_2, b_3, \ldots, b_n]$, where n is called the length. As an example, [1, 0, 1, 1, 0] is a bit-sequence, and the length is 5. (Observe that any set of symbols or numbers can be represented by distinct sequences of bits, so all methods of using bit-sequences here also apply to other sequences.)

The expression $\{f_1, f_2, f_3, \ldots, f_r\}$ denotes the building block functions, where $r = 2^K$ for some K. Then K bits uniquely represent one building block function. The arity of a function is the number of arguments that it requires. For example, the arity of the real-valued quadratic function $f(x) = x^2$ is 1. The arity of the projection function, $P_i: X^n \to X$, is n, where $P_i(x_1, x_2, \ldots, x_n) = x_i$.

A bit-sequence can represent the composition of building block functions. Define the building block function v as $v(x,y,z) = x$ if $(x \geq y$ AND $x \geq z)$, else $v(x,y,z) = y$ if $(y \geq x$ AND $y \geq z)$, else $v(x,y,z) = z$. To keep this example easy to understand, use four building block functions, $\{+, -, *, v\}$. Each sequence of two bits uniquely corresponds to one of these building block functions:

$$00 \leftrightarrow + \quad 01 \leftrightarrow - \quad 10 \leftrightarrow * \quad 11 \leftrightarrow v$$

The bit-sequence [00, 01] with length 4, encodes the function $+(-(x_1, x_2), x_3) = (x_1 - x_2) + x_3$. Observe that this function has arity 3. The bit-sequence [10, 01, 00, 11] with length 8, encodes the function $*(-(v(x_1, x_2, x_3), x_4), +(x_5, x_6)) = (v(x_1, x_2, x_3) - x_4) * (x_5 + x_6)$. This function has arity 6. The bit-sequence [11, 00, 01, 10, 00, 01, 01, 10, 00, 10] encodes the function $v(+(+(x_1, x_2), -(x_3, x_4)), -(-(x_5, x_6), *(x_7, x_8)), *(+(x_9, x_{10}), *(x_{11}, x_{12}))) = v(x_1 + x_2 + x_3 - x_4, x_5 - x_6 - (x_7 * x_8), (x_9 + x_{10}) * x_{11} * x_{12})$.

This function has arity 12.

For the general case, consider the building block functions, $\{f_1, f_2, f_3, \ldots, f_r\}$, where $r = 2^K$. Any bit-sequence, $[b_1 b_2 \ldots b_K, b_{K+1} b_{K+2} \ldots b_{2K}, \ldots, b_{aK+1} b_{aK+2} \ldots b_{(a+1)K}]$, with length $(a+1)K$ is a composition of the building block functions, $\{f_1, f_2, f_3, \ldots, f_r\}$. The composition of these r building block functions is encoded in a similar manner to the example with building block functions, $\{+, -, *, v\}$.

This paragraph defines other objects used in the template design. The distinct categories are $\{C_1, C_2, \ldots, C_N\}$. The population size of each generation is m. For each i, where $1 \leq i \leq N$, $E_{C_i}$ is the set of all learning examples that lie in category $C_i$. The symbol $\theta$ is an acceptable level of performance for a template. The symbol Q is the number of distinct templates whose fitness must be greater than $\theta$. The symbol $p_{crossover}$ is the probability that two templates chosen for the next generation will be crossed over. The symbol $p_{mutation}$ is the probability that a template will be mutated.

The overall steps of UBBE applied to template design are summarized in this paragraph. For each category pair $(C_i, C_j)$, $i<j$, the building blocks, $\{f_1, f_2, f_3, \ldots, f_r\}$, are used to build a population of m templates. This is accomplished by choosing m multiples of K, $\{l_1, l_2, \ldots, l_m\}$. For each $l_i$, a bit sequence of length $l_i$ is constructed. These m bit sequences represent the m templates, $\{T_1^{(i,j)}, T_2^{(i,j)}, T_3^{(i,j)}, \ldots, T_m^{(i,j)}\}$. The superscript (i, j) represents that these templates are evolved to distinguish examples chosen from $E_{C_i}$ and $E_{C_j}$. The fitness of each template is determined by how well the template can distinguish examples chosen from $E_{C_i}$ and $E_{C_j}$. The idea is to repeatedly evolve the population of bit-sequences, using crossover and mutation, until there are at least Q, (Q>0), templates which have a fitness greater than $\theta$. When this happens, choose the Q best templates, at distinguishing categories $C_i$ and $C_j$, from the population. Store these Q best templates in a distinct set, $\mathfrak{T}$, of high quality templates that are later used in the learning described in section C.

UBBE that designs high quality templates $\mathfrak{T}$ is presented below.

Unbounded Building Block Evolution Applied to Template Design

```
Set 𝔗 equal to the empty set.
For each i in {1,2,3,...,N}
For each j in {i+1,i+2,...,N}
{
    Build an initial population, A_(i,j) =
    {T_1^(i,j),T_2^(i,j),T_3^(i,j),...,T_m^(i,j)}, of
    templates, represented as m bit-sequences.
    Set q equal to zero.
    while( q < Q)
    {
        Set G equal to the empty set.
        while( size of G < m)
        {
            Randomly choose two templates, T_a^(i,j), T_b^(i,j), from A,
            where the probability of choosing a template for the next
            generation is proportional to its fitness .
            Randomly choose a number r between 0 and 1.
            If r < p_crossover, then crossover templates T_a^(i,j) and T_b^(i,j).
            Randomly choose numbers s_1, s_2 between 0 and 1.
            If s_1 < p_mutation, then mutate template T_a^(i,j).
            If s_2 < p_mutation, then mutate template T_b^(i,j).
            Set G equal to G ∪ {T_a^(i,j), T_b^(i,j)}.
        }
        Set A_(i,j) equal to G.
        For each template T_a^(i,j) in A_(i,j), evaluate its
        ability to distinguish examples from categories C_i and C_j.
        Store this ability as the fitness of T_a^(i,j).
        Set q equal to the number of templates with fitness
        greater than θ.
    }
    Choose the Q best templates, based on fitness, from A_(i,j)
    and add them to 𝔗.
}
```

Comments on UBBE

1.) The fitness $\phi_a$ of a template, $T_a^{(i,j)}$, is measured by computing a weighted average of the following criteria:

The ability of a template to distinguish examples lying in $E_{C_i}$ from examples lying in $E_{C_j}$ The amount of memory consumed by the template.

The average amount of computational time it takes to compute the template value function on the examples from $E_{C_i}$ and $E_{C_j}$.

A quantitative measure for the first criteria depends on the topology of the template value space, V. If V is $\{0, 1\}$, the ability of template $T_a^{(i,j)}$ to distinguish examples in $E_{C_i}$ from examples in $E_{C_j}$ equals $$\frac{1}{|E_{C_i}||E_{C_j}|} \sum_{e_j \in E_{C_j}} \sum_{e_i \in E_{C_i}} |T_a^{(i,j)}(e_i) - T_a^{(i,j)}(e_j)|.$$

Recall that $|E_{C_i}|$ is the number of examples in the set $\mathbb{E}_{C_i}$, and $|E_{C_j}|$ is the number of examples in the set $\mathbb{E}_{C_j}$. Further, $T_a^{(i,j)}(e_i)$ equals the result of the template value function of $T_a^{(i,j)}$ applied to the example $e_i$. $T_a^{(i,j)}(e_j)$ equals the result of the template value function of $T_a^{(i,j)}$ applied to the example $e_j$. These values are 1 or 0 when $V=\{0, 1\}$. The expression $|T_a^{(i,j)}(e_i) - T_a^{(i,j)}(e_j)|$ is the absolute value of the difference between $T_a^{(i,j)}(e_i)$ and $T_a^{(i,j)}(e_j)$. For each example $e_j$ from the set $E_{C_j}$, a sum, $$\sum_{e_i \in E_{C_i}} |T_a^{(i,j)}(e_i) - T_a^{(i,j)}(e_j)|,$$

is computed as $e_i$ runs over all examples from the set $E_{C_i}$, and then each of these sums is summed together to yield, the total sum $$\sum_{e_j \in E_{C_j}} \sum_{e_i \in E_{C_i}} |T_a^{(i,j)}(e_i) - T_a^{(i,j)}(e_j)|.$$

This total has $|E_{C_i}||E_{C_j}|$ terms that are summed.

In the other cases, when V is not $\{0, 1\}$, then V has a metric, D, or a metric can be defined on V. A metric D is a method for measuring the distance between two points in the template value space V. When V is not $\{0, 1\}$, the ability of template $T_a^{(i,j)}$ to distinguish examples in $E_{C_i}$ from examples in $E_{C_j}$ equals $$\frac{1}{|E_{C_i}||E_{C_j}|} \sum_{e_j \in E_{C_j}} \sum_{e_i \in E_{C_i}} D(T_a^{(i,j)}(e_i), T_a^{(i,j)}(e_j)).$$

The amount of memory consumed by the template usually measures the number of bytes the template uses during runtime. The amount of computational time is measured at runtime.

2.) The diagram titled, Unbounded Crossover, demonstrates a crossover between two bit-sequences, $A=[a_1, a_2, a_3, \ldots, a_L]$ and bit-sequence $B=[b_1, b_2, b_3, \ldots, b_M]$. Keep in mind that L and M are each multiples of K, where $r=2^K$ and the primitive functions are $\{f_1, f_2, f_3, \ldots, f_r\}$. Also, in general $L \neq M$. Two natural numbers u and w are randomly chosen such that $1 \leq u \leq L$, $1 \leq w \leq M$ and u+M−w is a multiple of K. The multiple of K condition assures that after crossover, the length of each bit sequence is a multiple of K. This means that each bit sequence after crossover can be interpreted as a composition of the building block functions, $\{f_1, f_2, f_3, \ldots, f_r\}$. The numbers u and w identify the crossover locations on A and B, respectively. After crossover, bit-sequence A is $[a_1, a_2, a_3, \ldots, a_u, b_{w+1}, b_{w+2}, \ldots, b_M]$, and bit-sequence B is $[b_1, b_2, b_3, \ldots, b_w, a_{u+1}, a_{u+2}, \ldots, a_L]$.

3.) This comment explains mutation. The bit-sequence before mutation is $[b_1, b_2, b_3, \ldots, b_n]$. A mutation occurs when one of the bits is randomly chosen and its value is changed. More precisely, a random number k is chosen such that $1 \leq k \leq n$. If $b_k$ equals 0, then assign $b_k$ the value 1. If $b_k$ equals 1, then assign $b_k$ the value 0.

4.) The collection $\{\phi_1, \phi_2, \ldots, \phi_m\}$ represents the fitnesses of the templates, $\{T_1^{(i,j)}, T_2^{(i,j)}, \ldots, T_m^{(i,j)}\}$, in the current generation. The probability that template $T_a^{(i,j)}$ is chosen for the next generation is $$\frac{\phi_a}{\sum_{k=1}^{m} \phi_k}.$$

5.) $p_{crossover}$ should usually range from 0.3 to 0.7.

6.) $p_{mutation}$ should usually be less than 0.1.

General Unbounded Building Block Evolution

Before we present general UBBE, some symbols are defined and some modifications of UBBE applied to template design are explained. General UBBE designs competent task elements, $\mathfrak{E}_a$, to accomplish a task $\Gamma$ from a collection of building blocks. Q is the number of competent elements desired. $\mathfrak{T}$ stores the competent elements. The fitness, $\phi_a$, of element $\mathfrak{E}_a$ is its ability to accomplish the task $\Gamma$. As before, $\theta$ is an acceptable level of competency at performing task $\Gamma$. The method of crossover is the same as described in comment 2 and shown in the diagram titled Unbounded Crossover. The only difference is that the bit-sequences encode a composition of building blocks representing a task element rather than a template.

The method of mutation is the same as described in comment 3. Furthermore, the variables $p_{crossover}$, $p_{mutation}$ have the same purpose. However, for some tasks $\Gamma$, the values of $p_{crossover}$ and $p_{mutation}$ may lie outside the ranges recommended in comments 5 and 6. The method of encoding a composition of building blocks as a bit-sequence is the same as described near the beginning of this section. The general UBBE process is presented below.

Set $\mathfrak{T}$ equal to the empty set.

Build an initial population of task elements, $A=\{\mathfrak{E}_1, \mathfrak{E}_2, \mathfrak{E}_3, \ldots, \mathfrak{E}_m\}$, represented as m bit-sequences.

For each element $\mathfrak{E}_a$ in A, evaluate its ability to accomplish task $\Gamma$.

Store this ability as the fitness of $\mathfrak{E}_a$.
while(size of $\mathfrak{T}$<Q)

---

```
{
    Set G equal to the empty set.
    while( size of G < m)
    {
        Randomly choose two elements, $\mathfrak{E}_a$ and $\mathfrak{E}_b$, from A, where the probability of
        choosing an element $\mathfrak{E}_a$ for the next generation equals $\frac{\phi_u}{\sum_{k=1}^{m} \phi_k}$.
        Randomly choose a number r between 0 and 1.
        If r < $p_{crossover}$, then crossover elements $\mathfrak{E}_a$ and $\mathfrak{E}_b$.
        Randomly choose a number $s_1$ between 0 and 1.
        If $s_1$ < $p_{mutation}$, then mutate element $\mathfrak{E}_a$.
        Randomly choose a number $s_2$ between 0 and 1.
        If $s_2$ < $p_{mutation}$, then mutate element $\mathfrak{E}_b$.
        Set G equal to G $\cup$ {$\mathfrak{E}_a$, $\mathfrak{E}_b$}.
    }
    If the (size of G ) > m,
        then set A equal to the m elements in G with the highest fitness
        else set A equal to G.

For each element $\mathfrak{E}_a$ in A, evaluate its ability to accomplish task $\Gamma$.
    Store this abiltiy as the fitness of $\mathfrak{E}_a$.
    For each element $\mathfrak{E}_a$ in A, if its fitness $\phi_a > \theta$, set $\mathfrak{T}$ equal to $\mathfrak{T} \cup \{\mathfrak{E}_a\}$.
    ($\cup$ means set union, so $\mathfrak{E}_a$ is added to $\mathfrak{T}$ only if it is not already in $\mathfrak{T}$.)
}
```

---

UBBE Versus Prior Art

A substantial improvement of UBBE over prior art is that it evolves sequences with unbounded lengths. Prior art assumes that all of the sequences in the population are the same fixed length. In the prior art, the fixed length of the sequences limits the complexity of the elements that can be constructed from evolution.

Another substantial improvement of UBBE over prior art is UBBE's sequence encoding of a composition of building blocks. The UBBE encoding also enables each building block to have a different structure from the other building blocks. The prior art does not have a method for crossover of two bit sequences with different lengths because they assume that a fixed range of locations of the sequence always encodes for the same functionality. On the other hand, UBBE's encoding at any location in the sequence can vary. For this reason, UBBE creates a more flexible, expressive encoding mechanism. With sequences having two different lengths, the prior art's method of crossover would be unable to preserve useful (high fitness) subsets of the sequence during evolution. These useful (high fitness) subsets of the sequence are often called schema in the evolution literature. Overall, the fixed location assumption by prior art creates a debilitating limitation on what prior art sequences can encode.

E. Krugfat Applied to Handwriting Recognition

One of the big problems with wireless appliances such as cell phones and Palm handhelds is that they are too small to support a keyboard. Another problem is that companies such as FedEx have important handwritten information—mailing address, tracking numbers—on forms that they need to access on the Internet. It is very expensive, error-prone and time consuming to type this information into the computer. Consequently, there is a great demand for software that can recognize a person's handwriting.

To do this, handwriting recognition software must convert a sequence or stream of handwritten shapes, symbols or characters to a sequence of numbers that the computer uses to represent these symbols or characters. In ASCII format, the number 97 represents lowercase "a", 98 represents lowercase "b", 99 represents lowercase "c", and so on. There are many different types of formats for representing symbols in a computer. The methodology presented here is independent of the format.

Below is an illustration of the basic idea. After the learning, the set of points {A,B,C,D,E,F,G,H,I,J,K,L, M}

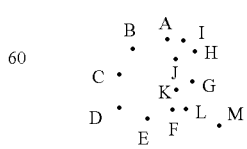

is converted to the letter 'a' by the the handwriting recognition software. And the sequence of points:

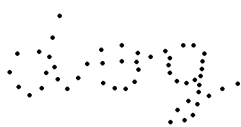

is mapped to the sequence of letters: <d, o, g>. The methodology works for all types of shapes, so it works for all written languages. For example, the methodology can be trained to recognize the arabic letters:

This methodology can also be trained to recognize chinese characters:

Again, the key idea is to choose the proper templates for distinguishing the different categories of shapes. The templates can be user defined. Some user defined templates are:

1.) The shape has a loop in it.

2.) The shape contains no loops.

3.) The shape has a corner(s) at the bottom of the letter.

4.) The shape has dot(s) above or below the symbol:

5.) The shape has a segment above or below the symbol.

6.) The shape contains two curves that intersect:

7.) The shape has mirror symmetry.

8.) The shape has radial symmetry.

9.) The shape has a vertical line in it.

10.) The shape has a horizontal line in it.

11.) The winding number of the shape is greater than a fixed member of radians. (This template is parameterized by a real number r so it actually represents an infinite number of templates. For example, 'o' has a winding number>($2\pi31 \epsilon$) where $\epsilon$ is very small. 'e' has a winding number of about $2\pi$.

12.) The instantaneous absolute value of the winding number of the shape is greater than a fixed value.

13.) The user must lift the pen off the paper or writing tablet to create this shape.

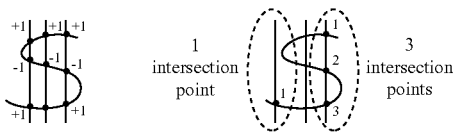

14.) Foliation and intersection points.

In addition to humanly understandable templates, here are mathematical templates that are not describable in a natural language such as English. For example, the template, $$+\left(-\left(-\left(O\left(X_0, X_1\right)\right), X_2\right), X_3\right), X_4\right)$$

distinguishes my handwritten lowercase 'a' from lowercase 'b'. This template was designed by UBBE, using simple binary mathematical functions as the building blocks.

Now the handwriting recognition example is illustrated showing one trial in the recognition phase, using humanly understandable templates. The category space $C=\{a,b,c,d,e,f,g,h,i,j,k,l,m,n,o,p,q,r,s,t,u,v,w,x,y,z\}$. To illustrate this example, choose the handwritten letter l to recognize:

The program initializes $S=C$.

STEP I.) The program randomly chooses a template. Suppose template 1. was chosen. Since the handwritten letter has no loops the following categories are removed from S: 'a', 'b', 'd', 'e', 'g', 'o', 'p', 'q'. At this point, $S=\{c,f,h,i,j,k,l,m,n,r,s,t,u,v,w,x,y, z\}$.

STEP II.) Choose a random template. Suppose template 7 was chosen. Since the handwritten letter has mirror symmetry, the following categories are removed from S: 'c', 'f', 'h', 'j', 'k', 'm', 'n', 'r', 's', 'u', 'y', 'z'. At this point, $S=\{i,l,t,v,w, x\}$.

STEP III.) Choose a random template. Suppose template 6 was chosen. Since the handwritten letter does not contain two curves that intersect, the following categories are removed: 't', 'x'. At this point, $S=\{i,l,v,w\}$.

STEP IV.) Choose a random template. Suppose template 9 was chosen. Since the handwritten letter has a vertical line segment, the following categories are removed: 'w', 'v'. At this point, $S=\{i,l\}$.

STEP V.) Choose a random template. Suppose template 4 was chosen. Since the handwritten letter has no dots above it, the category 'i' is removed. At this point, $S=\{l\}$. Consequently, increment the category score for category 'l' by one. This completes the description of one trial of the recognition phase.

Additional trials are executed similarly to what was just descibed. Keep in mind that since the order of the templates is chosen randomly, in a subsequent trial, the program may choose template 12 first, and then template 5, and so on.

The handwriting recognition templates presented here are a subset of a more general collection of templates, called shape recognition templates. Shape recognition templates are comprised of templates that ascertain the geometry of a part of an object. This geometry could be in two dimensions, three dimensions or higher dimensions. Shape recognition templates are comprised of templates built for the following applications, vision recognition, speech recognition, image recognition, molecular recognition, and gene expression patterns. For example, face recognition, fingerprint recognition, and iris recognition are types of image recognition. The recognition of a part on an automated assembly line by computer software is a type of vision recognition. Molecular recognition involves the recognition of molecule based on its elements.

F. Krugfat Applied to Information Retrieval

The United States patent office may want to organize their online documents based on the subject matter. This could be a monumental task without using software. A patent examiner first designates what categories he/she wants to use for classification. For example, some of the categories in a library could be "biotech", "electronic commerce", "manufacturing", "bicycles", "transporation", "automobiles", "airplanes", "motorcycles", "finance", "bonds", "stocks", "real estate", "sports", "baseball", "software", "Linux", "bridges" and so on. (Notice that double quotes are used to surround a sequence of words representing a category.) Then the user provides examples of each particular category. For example, a sports article about the "Mets beat the Astros" is in the category "sports" and "baseball". The documents that the software is trained on are the learning examples.

Before some extremely effective templates are described, some vocabulary is carefully defined. In what follows, 'concept' is used with a precise meaning illustrated by some examples. 'Concept' does not have the same meaning as 'word': 'red' and 'rioja' are different words, but represent the same concept when referring to color. 'Ice' and 'solid water' are two distinct ways to represent the same concept. Single quotes are used to surround a sequence of words representing a concept.

Based on software testing, the following templates enable the recognition phase to predict the category (subject matter) of a new—up to this point unread—document with greater than 87% accuracy, when trained on less than 100 documents per category. And these templates enable the recognition phase to predict the category of a new—up to this point unread document with greater than 93% accuracy, when trained on less than 1000 documents per category.

1.) At least one of the following concepts occurs in the document.

2.) All of the following concepts occur in the document.

3.) All of the following concepts occur in the same sentence of the document.

4.) All of the following concepts occur in this order in the document.

5.) All of the following concepts occur in the same sentence in this order.

6.) None of the following concepts occur in the document.

7.) At least one of the following concepts do not occur in the document.

8.) All of the following concepts do not occur in the same sentence of the document.

9.) All of the following concepts do not occur in this order in the document.

10.) All of the following concepts do not occur in the same sentence in this ORDER.

11.) All of the following concepts occur in the same <DOER, ACTION> phrase in this document.

12.) All of the following concepts occur in the same <DOER, ACTION, OBJECT> phrase in this document.

Comment 1:

There are an infinite number of possibilities for a <DOER, ACTION> phrase. However, this method is best explained by listing a number of examples.

Illustrative examples of <DOER, ACTION> phrases:

1.) Kathy talks too much. DOER: 'Kathy'. ACTION: 'talks'.

2.) The dog barks all night. DOER: 'dog'. ACTION: 'barks'.

3.) Mary worries about her children. DOER: 'Mary'. ACTION: 'worries'.

4.) The U.S. patent office wants to organize their online documents based on the subject matter. DOER: 'U.S. patent office'. ACTION: 'wants to organize'.

5.) The red corvette stopped running. DOER: 'red corvette'. ACTION: 'stopped running'.

6.) The dinosaurs became extinct long ago. DOER: 'dinosaurs'. ACTION: 'became extinct'.

7.) The bond market will close in an hour. DOER: 'bond market'. ACTION: 'will close'.

8.) My stock purchase will settle in three days. DOER: 'stock purchase'. ACTION: 'will settle'.

9.) The operating system boots up. DOER: 'operating system'. ACTION: 'boots up'.

10.) The option expired. DOER: 'option'. ACTION: 'expired'.

11.) The glass shattered. DOER: 'glass'. ACTION: 'shattered'.

Comment 2:

Likewise, there are an infinite number of possibilities for a <DOER, ACTION, OBJECT> phrase. This method is also best explained by listing a number of examples.

Illustrative examples of <DOER, ACTION, OBJECT> phrases:

1.) The gamma ray split the atom. DOER: 'gamma ray'. ACTION: 'split'. OBJECT: 'atom'

2.) The elephant ate salty peanuts. DOER: 'elephant'. ACTION: 'ate'. OBJECT: 'salty peanuts'.

3.) Mary loves Bob. DOER: 'Mary'. ACTION: 'loves'. OBJECT: 'Bob'.

4.) The corporation sold the Empire State Building. DOER: 'corporation'. ACTION: 'sold'. OBJECT: 'Empire State Building'.

5.) Harry trades bonds for a living. DOER: 'Harry'. ACTION: 'trades'. OBJECT: 'bonds'.

6.) Professor Rebholz knows Shakespeare well. DOER: 'Professor Rebholz'. ACTION: 'knows'. OBJECT: 'Shakespeare'.

7.) The pope prays to God for peace in the Middle East. DOER: 'pope'. ACTION: 'prays'. OBJECT 'peace in the Middle East'.

8.) The ship sailed to Hawaii. DOER: 'ship'. ACTION: 'sailed'. OBJECT: 'Hawaii'.

9.) The asteroid crashed into the Pacific ocean. DOER: 'asteroid'. ACTION: 'crashed'. OBJECT: 'Pacific ocean'.

10.) Father Ferapoint was silent. DOER: 'Father Ferapoint'. ACTION: 'was'. OBJECT: 'silent'.

11. Do you think that all the combined wisdom of the earth could think up anything faintly resembling in force and depth those three questions that were actually presented to you then by the powerful and intelligent spirit in the wilderness? DOER: 'combined wisdom of the earth'. ACTION: 'could think up'. OBJECT: 'anything faintly resembling in force and depth those three questions that were actually presented to you then by the powerful and intelligent spirit in the wilderness'.

12.) The miracle lay precisely in the appearance of those three questions. DOER: 'miracle'. ACTION: 'lay precisely'. OBJECT: 'the appearance of those three questions'.

13.) Abandon your gods. DOER: <Person referred to in the context of this sentence>. ACTION: 'abandon'. OBJECT: 'your gods'.

14.) Come here. DOER: <Person referred to in the context of this sentence>. ACTION: 'come'. OBJECT: <Location referred to by the word "here" in this context>.

Comment 3:

There are many additional templates that can be defined and used. One can define templates that are Boolean combinations of the templates listed here.

Template 2 instantiated with the concepts "homer" and "run" is useful for distinguishing documents lying in the "baseball" category from documents lying in the "dog" category. Template 3 instantiated with the concepts "bark" and "growl" is useful to distinguish a document lying in the category "dog" from a document lying in the category "cat".

Using the learning examples, and many other templates similar to those mentioned above and genetically evolved templates, the learning phase builds the prototype functions $T_k(c)$ as already discussed in the Learning section.

Note that there are an infinite number of templates so it is not possible to list all of them here. This includes templates used for foreign languages.

G. Krugfat Applied to Gene Expression

At this stage in the genomics revolution, scientists are still attempting to figure out which genes perform what particular functions. For example, if scientists can figure out that a mutation in gene 19, or gene 53, or gene 120 makes it more likely for a person to get lung cancer, then this knowledge greatly enables medical researchers and doctors working to prevent lung cancer. Consequently, the ability to classify groups of genes into functional—what the gene does—categories is extremely important.

The important idea here is that if a group of genes all have a similar expression pattern, then it is extremely likely that this group is working together to perform some important function for the body:

1.) The development of a new antibody to destroy a dangerous virus, a bacteria or cancer cells.

2.) The breakdown of toxic poisons into harmless compounds.

3.) The conversion of sugar to energy.

4.) The creation of new membrane proteins at a neural synapse enabling a new memory to be stored.

The four functions just mentioned are just a few of the many functions that genes code for. The goal is to classify groups of genes into the same functional category based on criteria defined by a person or software. In this example, the criterion is the gene's expression pattern. In the diagram titled Gene Expression, each square represents a different gene. In a single square, the shape that you see is a gene expression pattern: for example, the horizontal axis represents the time and the vertical axis represents the amount of that gene's expression at a certain time. As you can see, some expression patterns have similar shapes. For clarity, refer to squares in the diagram as follows: the upper left square is gene (1, 1), and the first number is the row number and the second number is the column number. Then gene (10, 1) and gene (10, 2) are similar because their expression patterns are both horizontal line segments, so these two genes are in the same category. Similarly, gene (4, 2) and gene (5, 3) are in the same category because their expression patterns each have two mountain tops with the same height.

Just as handwritten letters are categorized based on their shapes, genes are categorized based on their gene expression patterns. Below is a list of some, but not all, of the templates that can be constructed to categorize gene expression.

1.) The slope of any tangent line to the expression graph is greater than zero. Travelling from left to right, the graph is uphill. Examples:

 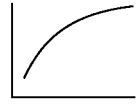

2.) The slope of any tangent line to the expression graph is less than zero. Travelling from left to right, the graph is downhill. Examples:

 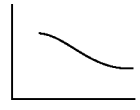

3.) The expression graph is concave up.

Examples

 

4.) The expression graph is concave down.

Examples

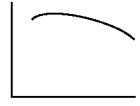 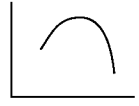

5.) The expression graph has n local maxima, where n can be 1, 2, 3, 4, . . . The expression graph has 2 mountain tops.

Examples

 

6.) The expression graph has n local minima, where n can be 1, 2, 3, 4, . . . The expression graph has 2 valley bottoms.

Examples

 

7.) In the expression graph, the first mountaintop is lower than the second mountaintop.

Examples

8.) In the expression graph, the first mountaintop is higher than the second mountaintop.

Examples

9.) In the expression graph, the first valley is lower than the second valley.

Examples

10.) It the expression graph, the first valley is higher than the second valley.

Examples

H. Building Analogies with Adaptable Templates

In addition to the notion of templates, there is a notion of a template map: a template map can be a relation on a set of all templates in a template space, or the analogous notion to set theory in mathematical category theory—a collection of morphisms. This is useful because it enables KRUGFAT, to create representations of analogies, and equivalence classes that allow for fuzzy pattern recognition, classification, and the linking of knowledge across very different domains.

A template map takes a template as its function argument and returns a template as its image. In other words, the domain and range of a template map are a space of templates. (One implementation is shown in the JAVA source code.) For templates that are represented as a finite sequence of variables $v_1, v_2, v_3, \ldots, v_n$, some of the more important template maps are the mirror map, the projection map, the shift map, and the composition map.

The mirror map is $mirror(x)=-x$ if the template x is an element of a vector space. If not, then $mirror(v_1, v_2, v_3)=(v_3, v_2, v_1)$ In the more general case, $mirror(v_1, v_2, v_3, \ldots, v_n)=(v_n, \ldots, v_3, v_2, v_1)$.

The projection maps project a number of template variables to a lower dimension. For example, $proj_{(1,3)}(v_1, v_2, v_3)=(v_1, v_3)$. And $proj_{(1,3,4)}(v_1, v_2, v_3, v_4)=(v_1, v_3, v_4)$. Obviously, there are an infinite number of distinct projection maps.

The shift map takes a template and shifts the variables by 1 position. For example, if the template is $(v_1, v_2, v_3, v_4)$, then $shift(v_1, v_2, v_3, v_4)=(v_4, v_1, v_2, v_3)$.

The composition map is a template map which is created with two arguments that are template maps. It creates a new template map by taking the function composition of these two template maps.

When there is more structure to the templates, the template maps take on a different form. For example, the variables in the template could have a two dimensional topology or an n-dimensional topology. Also, the template could even have a tree topology:

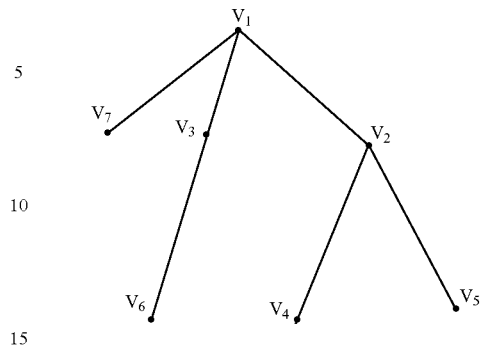

I claim:

1. A machine comprising:
   (a) a memory which stores a collection of templates, the collection of templates being created in association with a set of categories including at least one template that is not itself any of the set of categories and is not a member of any of the set of categories, and
   (b) a learning component that constructs said templates by at least
   testing a first set of templates by at least
       categorizing an example of an item having a known categorization into one of the set of categories based on computed relationships between each of a first set of templates and the example,
   constructing a second set of templates based on the testing and first set of templates,
   forming the collection of the templates stored in the memory based on performing the testing and the constructing one or more times.

2. The machine of claim 1 wherein the learning component is configured to perform at least an evolution process that includes the testing, constructing, and forming to construct the collection of templates.

3. The machine of claim 1 wherein the learning component is configured to construct templates by at least a template map taking one or more templates as the template map's functional argument and returning another template.

4. The machine of claim 1 wherein the learning component is configured to construct templates by at least computing a value for a matching function and determining whether to include the template in a set of templates associated with a category based at least in part on the value.

5. The machine of claim 1 wherein the learning component is configured to construct templates by at least computing template value functions, which map a set of examples to a set of values, wherein the set of examples are examples of items that are desired to be categorized.

6. The machine of claim 1 wherein the learning component is configured to construct templates by at least computing prototype functions, which are functions that map a set of categories into a group of sets that include all subsets of a set of values, wherein the prototype function of a single category is the collection of all template values that result from all training examples associated with the category, wherein the training examples are examples of members of categories having a pre-established categorization.

7. The machine of claim 1 wherein the learning component is configured to construct templates by at least removing a template from the collection of templates associated with a category if the template is determined to not identify any training examples from a set of training examples are a set of members of categories having a pre-established categorization.

8. The machine of claim 1 wherein the learning component is configured to construct one or more shape recognition templates.

9. The machine of claim 1 wherein the learning component is configured to construct one or more information retrieval templates.

10. The machine of claim 1 wherein the learning component is configured to construct one or more bioinformatics templates.

11. The machine of claim 1, wherein
the memory also stores at least one or more instructions for categorizing previously uncategorized examples based on the templates,
the uncategorized examples are items for which a categorization is desired, and
the machine is configured for implementing at least the one or more instructions.

12. The machine of claim 1, wherein
the memory also stores at least one or more instructions for
recognizing handwritten characters based on the templates, and
returning machine produced characters corresponding to the handwritten characters, based on the recognizing, and
the machine is configured for implementing at least the one or more instructions.

13. The machine of claim 1, wherein
the memory also stores at least one or more instructions for retrieving information based on the templates, and
the machine is configured for implementing at least the one or more instructions; and
the machine is configured for returning the information retrieved.

14. The machine of claim 1, wherein
the memory also stores at least one or more instructions for
identifying gene expressions based on the templates, and
returning the gene expressions identified; and
the machine is configured for implementing at least the one or more instructions.

15. The method of claim 1, further comprising identifying gene expressions based on one or more templates selected from the collection of templates.

16. The machine of claim 1, wherein said machine does not get stuck in local minima,
wherein said machine is capable of learning information that would not have been learned without the templates, and
wherein said machine performs computations faster than were templates not used.

17. A machine comprising:
a memory that stores
one or more category spaces,
a collection of templates, the collection of templates being created in association with a set of categories including at least one template that is not itself any of the set of categories and is not a member of any of the set of categories, and
a learning component that constructs said templates.

18. A machine comprising:
(a) a memory which stores a collection of one or more category distinguishing elements, which will be referred to as one or more templates, the one or more templates being created in association with a set of categories including at least one template that is not itself any of the set of categories and is not a member of any of the sets of categories,
(b) a recognition component that compares an example, which is an item for which a categorization is desired, to at least one of the one or more templates to remove a category from a set of possible categories that the item is expected to belong to, and
the machine outputs results of the categorization.

19. The machine in claim 18 wherein new templates are constructed from old templates that are chosen randomly from a prior set of templates.

20. The machine in claim 19 wherein a non-uniform probability distribution is assigned to the templates and a likelihood that a given template is selected via choosing the templates randomly is based on the non-uniform probability distribution.

21. The machine in claim 18 wherein the recognition component compares the example by computing a value for a matching function based on the template and the category.

22. The machine in claim 18 wherein
after executing the recognition component a determination is made by the machine as to which of a pre-established set of categories the example belongs, and as a result of the determination one possible outcome is that the example is determined to be a member of zero or more categories.

23. The machine in claim 18 wherein the one or more templates are user-created.

24. The machine in claim 18 wherein the one or more templates were constructed from evolution.

25. The machine of claim 18 wherein the one or more templates include at least one or more shape recognition templates, and the results of the categorization includes a machine representation of a shape that was recognized.

26. The machine of claim 18 wherein the one or more templates include one or more information retrieval templates, and the results of the categorization includes at least a machine representation of information retrieved.

27. The machine of claim 18 wherein the one or more templates include one or more bioinformatics templates, and the results of the categorization includes at least a machine representation of a gene expression.

28. The machine of claim 18, wherein said machine categorizes the item at a speed that is faster than were the item not compared to the one or more category distinguishing elements, and
wherein said machine categorizes the item at an accuracy that is greater than were the item not compared to the one or more templates 29. A machine comprising:
(a) a unit that implements an evolution that builds competent elements from building blocks, wherein the competent elements are elements that are capable of distinguishing into which category of a set of categories previously uncategorized examples are to be categorized,
the competent elements, being created in association with the set of categories including at least one competent element that is not itself any of the set of categories and is not a member of any of the set of categories,
the set of categories being categories into which initially uncategorized examples are to be categorized, by at least computing a relationship between the competent elements and the initially uncategorized examples, wherein the initially uncategorized examples are items for which a categorization is desired, but the categorization is initially unknown, and (b) a memory that stores said competent elements, wherein the machine is configured for
receiving the initially uncategorized examples,
categorizing the initially uncategorized examples into a plurality of predetermined categories by at least computing the relationship between the competent elements and the initially uncategorized examples, and
returning an indication of the categorization.

30. The machine in claim 29 wherein the unit that implements the evolution is configured to allow a length of a sequence of any one generation to be greater than a corresponding sequence of a prior generation.

31. The method of claim 30, wherein the sequence increases in length during a crossover operation that is based on a single crossover point on the sequence and a single crossover point on another sequence participating in the crossover, and the method does not execute any instruction, that expressly limits the length.

32. The machine in claim 29 wherein the unit that implements the evolution is configured to allow a formation of two or more sequences with different lengths as a result of executing one evolution process.

33. The machine in claim 32 wherein a location within a sequence at which a crossover occurs is varied from a first sequence to a corresponding sequence generated from the first sequence.

34. The machine in claim 29 wherein said building blocks are functions.

35. The machine in claim 29 wherein said elements are selected from the group consisting of templates and components of templates.

36. The machine in claim 35 wherein the unit that implements the evolution is configured to compute one or more fitness values of said elements that depend on an ability of the elements to distinguish which category a training example is associated with, wherein a training example is an example of a member of a category having a pre-established categorization.

37. The machine in claim 29 wherein the sequences encode a composition of building blocks.

38. The machine in claim 29 wherein the unit that implements the evolution is configured to perform a crossover at a location during an evolution that is different than another location where another crossover occurs during the evolution.

39. The machine in claim 29 wherein the unit that implements the evolution is configured to compute a fitness of an element that depends on its computational time.

40. The machine in claim 29 wherein the unit that implements the evolution is configured to compute a fitness of an element that depends on its memory usage.

41. The machine in claim 29 wherein the unit that implements the evolution is configured to compute a fitness of an element that depends on the element's competence in distinguishing between which categories a categorized example is to be classified.

42. The machine in claim 29 wherein at least one of the competent elements is a template and at least one of the competent elements is a component of a template.

43. The machine of claim 29, wherein said machine constructs elements that are better at distinguishing between categories than were building blocks not used, and
wherein said machine builds elements faster than were building blocks not used.

44. A machine-implemented method comprising:
(a) storing, in a memory, a collection of templates, the collection of templates being created in association with a set of categories including at least one template that is not itself any of the set of categories and is not a member of any of the set of categories,
(b) executing a learning phase which constructs said templates by at least
testing a first set of templates by at least
categorizing an example of an item having a known categorization into one of the set of categories based on computed relationships between each of a first set of templates and features of the item,
constructing a second set of templates based on the testing and initial set of templates, and
forming the collection of the templates stored in the memory based on performing the testing and the constructing one or more times.

45. The method of claim 44 wherein executing the learning phase includes at least constructing the templates based at least on one or more category spaces.

46. The method of claim 44 wherein during the learning phase an evolution is implemented to construct the templates, where the evolution includes at least the testing, the constructing and the forming.

47. The method of claim 44 wherein during the learning phase template maps take one template as a functional argument and create one or more other templates.

48. The method of claim 44 wherein during the learning phase a value for a matching function is computed and a determination is made whether to include the template in a set of templates associated with a category based at least in-part on the value.

49. The method of claim 44 wherein executing the learning phase includes at least constructing templates by at least computing template value functions, which map a set of training examples to a set of values, wherein the set of training examples are examples of members of categories for which the categorization is pre-established.

50. The method of claim 44 wherein executing the learning phase includes at least computing prototype functions, which are functions that map a set of categories into a group of sets that include all subsets of a set of values, wherein the prototype function of a single category is the collection of all template values that result from all training examples associated with the category, wherein the training examples are examples of members of categories that have a pre-established categorization.

51. The method of claim 44 wherein executing the learning phase includes at least removing templates from the template set based at least on a determination of at least one criterion of an ability for the templates removed to distinguish between which categories to associate with a training example, which is an example of a member of a category having a pre-established categorization.

52. The method of claim 44 wherein executing the learning phase includes at least constructing one or more shape recognition templates.

53. The method of claim 44 wherein executing the learning phase includes at least constructing one or more information retrieval templates.

54. The method of claim 44 wherein executing the learning phase includes at least constructing one or more bioinformatics templates.

55. The method of claim 44, further comprising categorizing previously uncategorized examples based on one or more templates selected from the collection of templates, wherein the previously uncategorized examples are items for which categorizations are desired, but were not previously determined.

56. The method of claim 44, further comprising recognizing handwritten characters based on one or more templates selected from the collection of templates, and returning machine representations of characters based on the handwritten characters recognized.

57. The method of claim 44, further comprises retrieving information based on one or more templates selected from the collection of templates.

58. The method claim 44, wherein the learning phase comprises:
    iterating thru each template of the collection of templates, wherein an iteration of a current template includes at least
        initializing a first set to have one prototypical function for each template and category pair;
        initializing a second set to be equal to the first set;
        iterating thru each category, wherein an iteration of a current category includes at least
            constructing a set of training examples associated with the current category, wherein the training examples are examples of members of the current category that have been pre-established to be members of the current category;
            constructing the prototype function by at least setting the prototypical function associated with a current category equal to a union of all template values based on the set of examples;
            setting the second set equal to the union of the prior second set and the prototypical function associated with the current category;
        if the first set equals the second set, removing the current template from the template set;
    storing templates, remaining in the set of templates, in long-term memory.

59. A system comprising a storage having one or more instructions stored thereon, wherein the one or more instructions are for implementing the methods of claim 58.

60. The method of claim 44,
    wherein said method does not get stuck in local minima,
    wherein said method is capable of categorizing examples that would not be categorizable without the templates,
    wherein the example is an item for which a categorization is desired, and
    wherein said method categorizes the examples faster than were templates not used.

61. A method comprising:
    (a) storing in a memory a collection of templates, the collection of templates being association with a set of categories including at least one template that is not itself any of the set of categories and is not a member of any of the set of categories,
    (b) executing a recognition phase that categorizes an example by at least comparing the example to at least a set of one or more templates selected from the collection of templates, wherein the example is an item for which a categorization is desired, and
    (c) returning the categorization.

62. The method in claim 61 wherein the set of templates are chosen randomly from the collection of templates.

63. The method in claim 61, the method further comprising: associating the collection of templates with a non-uniform probability distribution and choosing a template based on the non-uniform probability distribution.

64. The method in claim 61 wherein a determination as to whether an example matches a category is based on matching functions, which computes a similarity of the example to a category based on
    a template, and
    the category.

65. The method in claim 61 wherein categories are removed during execution of said recognition component.

66. The method in claim 61 wherein the example is categorized in zero or more categories.

67. The method in claim 61 wherein at least one of the collection of templates is user-created.

68. The method in claim 61, further comprising implementing an evolution process to construct one or more of the collection of templates.

69. The method of claim 61 wherein the set of templates includes at least one or more shape recognition templates, and the results of the categorization includes at least a shape that was recognized.

70. The method of claim 61 wherein the set of templates include at least one or more information retrieval templates, and the results of the categorization include at least information that was retrieved.

71. The method of claim 61 wherein the set of templates includes at least one or more bioinformatics templates, and the results of the categorization include at least a gene expression.

72. The method of claim 61, wherein the recognition phase comprises:
    performing a first set of instructions including at least
        choosing a current set of templates
            performing a second set of instructions including at least choosing a current template from the current set of templates;
                for each category in a current set of categories
                    computing a similarity between the example and a current category based on the current template, wherein the example is an item for which a categorization is desired;
                    if for the current category the similarity does not meet a predetermined threshold then removing the current category from the current set of categories
                for each category remaining in the current set of categories incrementing a category score associated with the category;
            repeating the performing of the second set of instructions a specified number of times;
        repeating the performing of the first set of instructions a specified number of times;
    for each category in the set of categories,
        if the category score meets a specified threshold, then adding the category to a set of one or more categories associated with the example.

73. A system comprising storage that stores instructions for implementing the method of claim 72.

74. The method of claim 61 further comprising:
    building an initial population of templates;
    performing a first group of instructions including at least
        performing a second group of instructions including at least
            randomly choosing two templates from the initial population, where the probability of choosing a given template is proportional to a fitness associated with the given template;
            randomly choosing a crossover number, which is a number chosen between an upper and lower limit;

if the crossover number is less than an assigned probability of a crossover then crossing over the two templates;
randomly choosing two permutation numbers, which are numbers between the first limit and the second limit;
if the first permutation number is less than an assigned probability of a mutation, then mutating a first of the two templates;
if the second mutation number is less than the assigned probability, then mutating a second of the two templates; and
adding the two templates to a first set of templates;
if the first set of templates has less than a specified number of templates,
repeating the performing of the second set of instructions;
setting -a second set of templates equal to the first set of templates;
for each template in the second set of templates,
evaluating the template's ability to distinguish whether a given training example is categorized in a first category or a second category,
wherein the training example is an example of a member of a category for which a categorization was pre-established;
storing the template's ability as a fitness associated with the template;
storing a template number representing how many templates have a fitness greater than a specified threshold;
if the template number is less than a threshold, repeating the performing of the first set of instructions; and
storing the second set of templates that results in association with an algorithm for categorizing items of interest for which a categorization has not yet been determined.

75. The method of claim 61,
wherein the machine categorizes the example faster than were templates not used,
wherein an accuracy with which the machine categorizes the example is higher than were said templates not used, and
wherein the machine is capable of categorizing examples that would not be categorizable without said templates.

76. A means for information retrieval comprising:
a memory which stores a collection of templates, the collection of templates being created in association with a set of categories including at least one template that is not itself any of the set of categories and is not a member of any of the set of categories, wherein
the means is configured for implementing a retrieval phase which retrieves information from a set of data by at least comparing the data to fractures of said templates, and returning the information retrieved.

77. The means in 76 wherein one or more of said templates include at least a
<DOER, ACTION> phrase.

78. The means in 76 wherein one or more of said templates include at least a
<DOER, ACTION, OBJECT> phrase.

79. The means in 76 wherein one or more of said templates are concept templates.

80. The means in 79 wherein said concept templates are selected from the group consisting of:
at least one of a set of concepts occur;
all of the set of concepts occur;
all of the set of concepts occur in the same sentence;
all of the set of concepts occur in a predetermined order;
all of the set of concepts occur in the same sentence in the predetermined order;
none of the set of concepts occur;
at least one of the set of concepts do not occur;
all of the set of concepts do not occur in the same sentence;
all of the set of concepts do not occur in the predetermined order;
all of the set of concepts do not occur in the same sentence in the predetermined order;
all of the set of concepts occur in the same <DOER, ACTION> phrase;
all of the set of concepts occur in the same <DOER, ACTION, OBJECT> phrase.

81. The means in 79 wherein the memory stores concept templates including at least
at least one of a set of concepts occur;
all of the set of concepts occur;
all of the set of concepts occur in the same sentence;
all of the set of concepts occur in a predetermined order;
all of the set of concepts occur in the same sentence in the predetermined order;
none of the set of concepts occur;
at least one of the set of concepts do not occur;
all of the set of concepts do not occur in the same sentence;
all of the set of concepts do not occur in the predetermined order;
all of the set of concepts do not occur in the same sentence in the predetermined order;
all of the set of concepts occur in the same <DOER, ACTION> phrase; and
all of the set of concepts occur in the same <DOER, ACTION, OBJECT> phrase.

82. A machine comprising:
a storage storing
a set of categories,
a set of category distinguishing elements, wherein
each category distinguishing element is stored in association with at least one category from the set of categories,
the set of category distinguishing elements is different than the set of categories,
one or more matching functions that includes at least inputs having at least
a category selected from the set of categories,
a category distinguishing element selected from the set of category
distinguishing elements, and
an example, wherein the example is an item for which a categorization is desired,
an output that has at least a similarity, which is a value representing how similar the example is expected to be to the category based on the inputs; and
a recognition unit that is capable of at least
categorizing the example based on the set of category distinguishing elements, the
matching functions, and the set of categories,
the machine being configured to return results of the categorizing.

83. A system comprising a storage having stored thereon one or more category distinguishing elements, wherein the one or more category distinguishing elements are not categories, and the at least one of the one or more category distinguishing elements does not belong to any of a set of predetermined categories that the category distinguishing items are designed to distinguish and program instructions for
- categorizing an uncategorized item into one of the set of predetermined categories based on the category distinguishing elements, and
- returning at least one of the predetermined categories based on the categorizing.

84. The system of claim 83, wherein at least one of the category distinguishing elements is associated with a category distinguishing function that maps a set of examples to a set of values based on the category distinguishing element wherein
- the examples are items for which a categorization is desired.

85. The system of claim 84, wherein at least one the category distinguishing elements is associated with a prototype function, which maps a set of categories to a power set of the set of values, wherein the power set of the set of values is a set of all possible sets that are formable from the set of values.

86. The system of 85, wherein the instructions include one or more instructions for constructing a prototype function by at least evolving an initial prototype function until the prototype function maps a set of categories to a power set of the set of values.

87. The system of claim 86, wherein the storage stores training elements in association with the one or more categories, and the prototype function is constructed such that the prototype function maps the training elements stored in association with one of the categories to a set of prototypical template values.

88. The system of claim 87, wherein the storage stores one or more matching functions, which for each template and category pair, the set of values are mapped to similarity values that indicate a degree to which the a template value associated with an uncategorized item is similar to a set of prototypical values associated with the category.

89. The system of claim 83, wherein
- the category distinguishing element defines a single aspect associated with one or more categories, and
- each of the one or more categories have multiple aspects.

90. The system of claim 83, wherein the category distinguishing element is not a feature of the category.

91. The system of claim 83, wherein the category distinguishing element is not an example of a member of any category.

92. The system of claim 83, wherein the category distinguishing element is a feature of at least one category, but is not an example of a member of any category.

* * * * *